(12) United States Patent
Habetha

(10) Patent No.: US 7,953,053 B2
(45) Date of Patent: May 31, 2011

(54) DISTRIBUTED RESOURCE RESERVATION IN A WIRELESS ADHOC NETWORK

(75) Inventor: Jörg Habetha, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 424 days.

(21) Appl. No.: 11/570,446

(22) PCT Filed: Jun. 10, 2005

(86) PCT No.: PCT/IB2005/051927
§ 371 (c)(1),
(2), (4) Date: Dec. 12, 2006

(87) PCT Pub. No.: WO2005/125047
PCT Pub. Date: Dec. 29, 2005

(65) Prior Publication Data
US 2007/0248063 A1    Oct. 25, 2007

(30) Foreign Application Priority Data
Jun. 16, 2004   (EP) .................................... 04102754

(51) Int. Cl.
*H04B 7/00*   (2006.01)
(52) U.S. Cl. ........ 370/338; 370/337; 370/441; 370/442; 370/443; 370/445; 455/450; 455/451; 455/452; 455/453
(58) Field of Classification Search .................. 370/338, 370/337, 441–462; 455/450–453
See application file for complete search history.

(56) References Cited

U.S. PATENT DOCUMENTS

| 5,638,378 | A | * | 6/1997 | Scop et al. ..................... 370/445 |
| 6,404,756 | B1 | * | 6/2002 | Whitehill et al. ............. 370/338 |
| 6,721,331 | B1 | * | 4/2004 | Agrawal et al. ............... 370/448 |
| 6,865,176 | B2 | * | 3/2005 | Averbuch et al. ............. 370/348 |
| 7,042,897 | B1 | * | 5/2006 | Sivaprakasam et al. ...... 370/462 |
| 7,184,407 | B1 | * | 2/2007 | Myles et al. .................. 370/242 |
| 7,321,762 | B2 | * | 1/2008 | Hoeben ....................... 455/412.2 |
| 2002/0085526 | A1 | * | 7/2002 | Belcea .......................... 370/337 |
| 2002/0167960 | A1 | * | 11/2002 | Garcia-Luna-Aceves .... 370/442 |

(Continued)

FOREIGN PATENT DOCUMENTS
WO   0128170 A2   4/2001
(Continued)

OTHER PUBLICATIONS

ANS/IEEE Std 802.11,: Part 11: Wireless LAN Medium Access Control (MAC) and Physical Layer (PHY) Specifications 1999 Edition.

(Continued)

*Primary Examiner* — Jinsong Hu
*Assistant Examiner* — Qun Shen

(57) ABSTRACT

The invention relates to a method of communication in a wireless communication system comprising a first station and at least a second station wherein each of the station for at least a part of the time controls the communication within the system. The first station encodes and transmits messages having a first format in a first mode using at least one communication channel or having a second format in a second mode using one communication channel. The first and second formats have a common part. The second station receives and decodes at least the common part of messages transmitted either the first mode or the second mode. The common part comprises information on one or more upcoming transmissions of the first station.

9 Claims, 2 Drawing Sheets

U.S. PATENT DOCUMENTS

| | | | |
|---|---|---|---|
| 2003/0012167 A1* | 1/2003 | Benveniste | 370/338 |
| 2003/0133469 A1* | 7/2003 | Brockmann et al. | 370/445 |
| 2004/0095911 A1 | 5/2004 | Benveniste et al. | |
| 2005/0032478 A1* | 2/2005 | Stephens et al. | 455/67.11 |
| 2005/0135284 A1* | 6/2005 | Nanda et al. | 370/294 |
| 2005/0180368 A1* | 8/2005 | Hansen et al. | 370/338 |
| 2005/0181728 A1 | 8/2005 | Hansen et al. | |
| 2006/0072492 A1* | 4/2006 | Trainin | 370/328 |

FOREIGN PATENT DOCUMENTS

| | | |
|---|---|---|
| WO | 0128170 A3 | 4/2001 |
| WO | 0221769 A2 | 3/2002 |
| WO | 2004114598 A1 | 12/2004 |
| WO | 2005109761 A1 | 11/2005 |

OTHER PUBLICATIONS

Written Opinion of the International Searching Authority, PCT/IB2005/051927.

Pallot, X . et al: Implementing Message Priority Policies Over an 802.11 Based Mobile ad hoc Network, IEEE vol. 2, Oct. 2001, pp. 860-864, XP010579128.

Written Opinion of the International Searching Authority, PCT/IB2005/051927.

ISR, International Search Report PCT/IB2005/051927.

* cited by examiner

DISTRIBUTED RESOURCE RESERVATION IN A WIRELESS ADHOC NETWORK

The invention relates to a method of communication in a wireless communication system as defined in the preamble of claim 1.

The invention also relates to a wireless communication system and a wireless communication device.

Such a method of communication in a wireless communication system is disclosed in IEEE Std. 802.11a, 1999, Wireless LAN Medium Access Control (MAC) and Physical (PHY) specifications: High Speed Physical Layer in the 5 GHz Band, IEEE, NY, 1999. A wireless communication system conforming this standard operates in the 5 GHz license free ISM band and is able to support raw date rates ranging from 6 to 54 Mbit/sec using orthogonal frequency division multiplexing (OFDM). IEEE Std 802.11b discloses a similar communication system for operation in the 2.4 GHz ISM band. Within IEEE Std. 802.11a and 11g channels having a bandwidth of 20 MHz are used to establish communication links. In general a channel in a wireless communication system is a sub-band for establishing a communication link within the frequency band in which the system operates. To satisfy the requirements of delay-bounded applications, a new specification has been proposed p802.11e incorporating data link layer functions to offer both statistic and parameterized QoS.

To support data rates up to about 100 Mbit/sec in the data link layer a new specification p802.11n will be proposed. In this proposal extensions to the 11a-based PHY and the 11e-based MAC standards are introduced, while keeping a certain level of backward compatibility. The PHY extensions are based on the support of multiple antenna systems (MIMO) and transmission in 40 MHz bands, so-called dual channel operation.

Wireless local area networks (WLANs) such as wireless communication systems compliant with one of the versions of IEEE Std. 802.11 or its proposed extensions are organized in cells or so-called basic service sets (BSS). Such cells comprise a number of wireless stations. In a first mode of operation, the so-called infrastructure mode, one station within such a cell is arranged to provide communication with other cells, a master station or access point via an inter-cell system or distribution system. The additional stations are arranged to communicate with each other and stations in other cells via the access point. Alternatively, in a second mode the so-called ad hoc mode a master station or access point is absent. A cell operating in the ad hoc mode is usually called an independent basic service set (IBSS). A cell operating in the ad hoc mode lacks the possibility to communicate with other cells, since the required infrastructure, basically an access point, is missing.

In a draft for the MAC specification of P802.11n an access mechanism is foreseen in which the master station reserves time slots on the medium for a station within the BSS. This access mechanism, called Reverse Direction Request (RDR) is an extended version of a mechanism known from IEEE Std. 802.11e and allows guaranteed (periodic) resource allocation (time slots and bandwidth) to a station. This supports transmission of real-time or otherwise time critical data.

However in an IBSS no master station is present that can grant access to guarantee a certain quality of service (QoS) for one or more stations. The stations have to access the medium in a more or less random access mode by using for instance the Carrier Sense Multiple Access with Collision Avoidance (CSMA/CA) protocol of IEEE Std. 802.11. Even though extensions exist for the CSMA/CA protocol such as for instance the so-called EDCA (enhanced direct carrier access) access mode in IEEE Std. 802.11e for an improved quality of service no allocations can be guaranteed and no periodic access is possible. This may result in frequent collisions resulting in data loss and thus in an inefficient use of the medium. Furthermore, it is known that CSMA/CA protocol is less suitable for multi-hop communication, that is communication between stations, routed via other stations.

The WO2004/114598 A1 describes a method to reserve the medium for a further transmission. It describes a reservation mechanism where reservation information is included piggyback in MAC (Medium Access Control) headers of messages or in the payload of data messages or acknowledge messages. However it does not differentiate between multiple antenna mode and single antenna mode.

Yet another method to reserve the medium for a further transmission is described in non published European patent application PCT/IB2005/051454. Here the stations distribute their reservation information in a dedicated beacon. In an infrastructure-based IEEE 802.11 network BSS beacons are normally sent by an Access Point. In an ad hoc IEEE 802.11 network beacons are sent alternately by different stations. In both cases per super frame only a single access point or station sends a beacon. However in the 802.11 standard, it is not explicitly excluded that several stations send their own beacon. In European patent application PCT/IB2005/051454 such a beacon is sent only for the purpose of distributing the reservation information. Other stations, which do not understand a distributed reservation protocol (DRP) but only the original IEEE Std. 802.11 standard, will interpret these beacons as coming from access points. The reservations are distributed in beacons, because stations not necessarily listen to data and acknowledgement packets or messages of other stations but they do listen to beacons transmitted by other stations. In order to assure that the reservations are respected by other stations, the other stations must be aware of the reservations of their neighboring stations. Furthermore, signaling a reservation in a beacon by means of legacy mechanisms, such as the so-called "contention-free period" guarantees that reservations are respected by legacy stations, even if these do not understand a distributed reservation protocol. However it also does not differentiate between multiple antenna mode and single antenna mode.

Amongst others it is an object of the invention to provide a method to reduce access collisions by allowing a guaranteed access to the medium in the absence of a master station.

To this end the invention provides a method of communication in a wireless communication system comprising a first station and at least a second station wherein each of the station for at least a part of the time controls the communication within the system, wherein the first station encodes and transmits messages having a first format in a first mode using at least one communication channel or having a second format in a second mode using one communication channel, wherein the first and second formats have a common part, wherein the second station receives and decodes at least the common part of messages transmitted in either the first mode or the second mode, wherein the common part comprises information on one or more upcoming transmissions of the first station.

The method according to the invention solves the problem of access collisions in a wireless communication system operating in an ad hoc mode in which each of the stations controls the communication within the system for at least a part of the time by providing information on one or more upcoming transmissions in a message format that can be decoded by a station that can only decode information in one of the possible formats thereby increasing the "audience" for the message.

The inventions bases on the thought to transmit the reservation information within this part of the header which is not transmitted according to the multiple antenna format. The header is used to train or calibrate the multiple antennas. A first part of the header is transmitted in the single antenna format, wherein the second part is transmitted in the multiple antenna mode or multiple antenna format. By incorporating the reservation information into the first part header, which is also called common part, the reservation will be recognized by the second stations which are not able to receive or to recognize the multiple antenna format. The first stations are able to receive signals according to the multiple antenna mode, wherein the second stations are either not trained to use the multiple antenna mode or they are in principle not able to use the multiple antenna mode. The invention is directed to infrastructure systems and ad hoc networks.

The above and other objects and features of the present invention will become more apparent from the following detailed description considered in connection with the accompanying drawings in which.

Figure 4A:
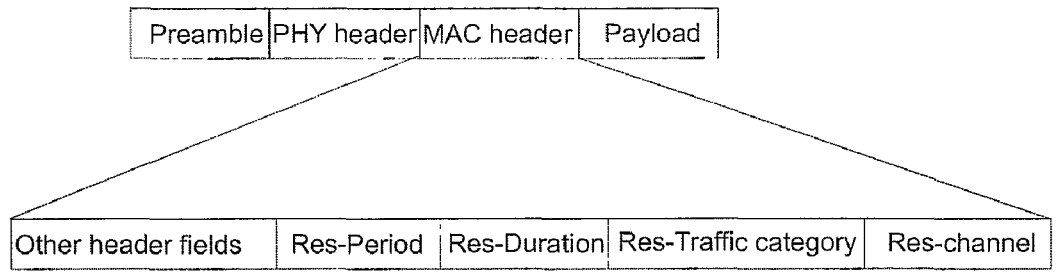
Figure 4B:
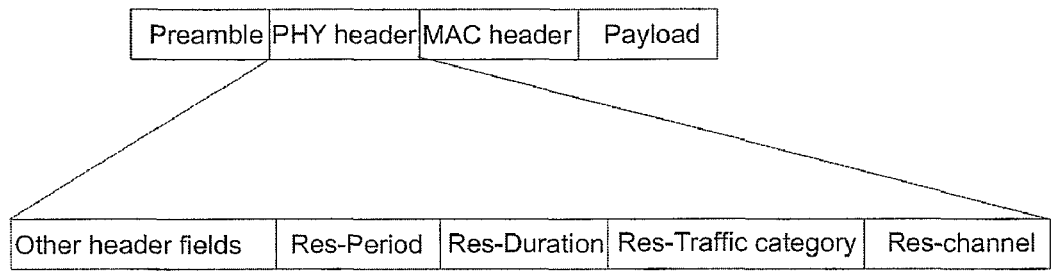

FIGS. 4a, b and 5 show another embodiments of the method according to the invention.

In these figures identical parts are identified with identical references.

Figure 1:
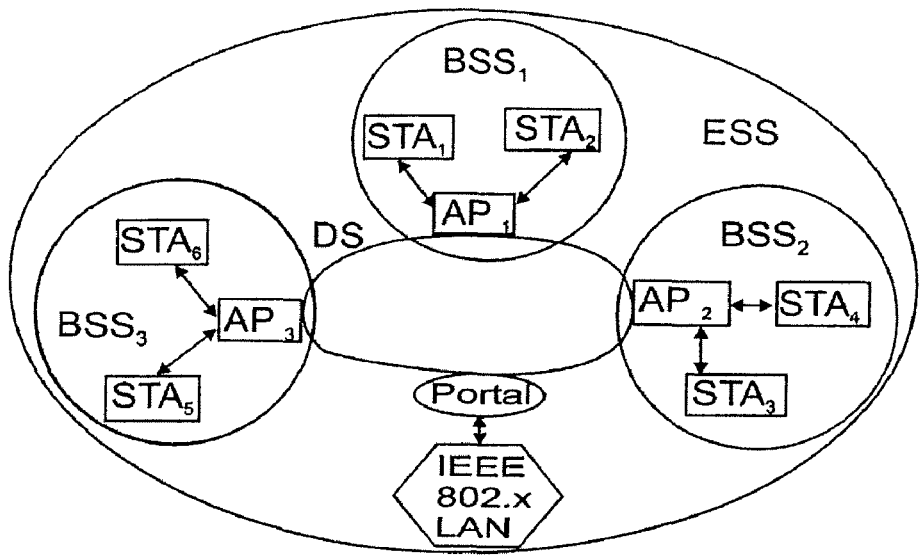
FIG. 1 shows a general overview of a communication system having an infrastructure according to one of the group of IEEE Std. 802.11 specifications.

FIG. 1 shows a general overview of a communication system having an infrastructure according to one of the group of IEEE Std. 802.11 specifications. The basic element in the network architecture is called the basic service set (BSS). The BSS is defined as a group of stations (wireless nodes) which are located within a general limited physical area within which each station (STA) is theoretically capable of communicating with every other STA (assuming an ideal environment with no communication barriers, physical or otherwise).

There are two basic wireless network design structures defined, ad hoc and infrastructure networks. An infrastructure-based IEEE 802.11 wireless network or communication system is composed of one or more BSSs which are interconnected through another network such as an IEEE 802.3 wired Ethernet network. This connecting infrastructure is called the Distribution System (DS). With this infrastructure each BSS must have exactly one wireless station connected to the DS. This station provides the functionality to relay messages from the other STAs of the BSS to the DS. This STA is called the Access Point (AP) for its associated BSS. The entity comprised of the DS and its connected BSSs is called an Extended Service Set (ESS). For the purposes of IEEE 802.11, the fact that the DS can move data between BSSs and to/from an external Portal is assumed, however the method used by the DS to accomplish this function is not defined.

A wireless communication with a proposed draft version of P802.11n has a similar set-up. The proposal foresees an access mechanism called HCCA (Hybrid Coordinator Controlled Access) in the access point or master station, in this case called the Hybrid Coordinator (HC), reserves time on the medium for a station. This access mechanism is taken from the IEEE Std. 802.11e but has an added type of traffic specification called periodic RDR (Reverse Direction Request), which allow for periodic allocation of resources to a station. As a result, real-time and other time critical applications, which require periodic and/or guaranteed resource allocations, are well supported in an infrastructure mode of operation. However in this access mechanism no support is provided for a wireless communication system operating in an ad hoc mode in which no access points are present.

Figure 2:
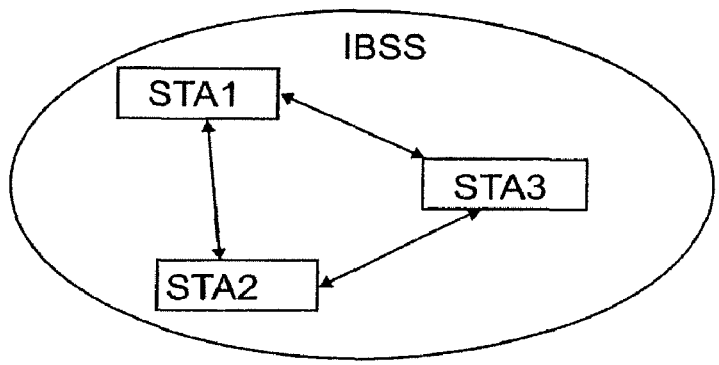
FIG. 2 shows a general overview of an ad hoc communication system according to one of the group of IEEE Std. 802.11 specifications.

FIG. 2 shows a general overview of an ad hoc communication system according to one of the groups of IEEE Std. 802.11 specifications. It comprises three stations STA1, STA2, and STA3. The BSS of an ad hoc network is referred to as an Independent BSS (IBSS). An ad hoc wireless network is basically the opposite of an infrastructure-based wireless LAN (WLAN). An ad hoc WLAN has no infrastructure, and therefore no ability to communicate with external networks. An ad hoc WLAN is normally setup purely to permit multiple wireless stations to communicate with each other while requiring as little external hardware or management support as possible.

In known wireless communication systems operating in an ad hoc mode of communication, a so-called independent basic service set IBSS, periodic allocations and Quality of Service (QoS) guarantees are not provided, because no master station or access point is present that can grant periodic allocations. In the known systems stations have to access the medium in random access mode using a Carrier Sense Multiple Access with Collision Avoidance (CSMA/CA) protocol. Even though IEEE 802.11e provides some extensions of CSMA/CA for an improved quality of service support in its EDCA access mode, no guarantees can be given and no periodic allocation is possible. As a result frequent collisions may occur that will hamper an efficient use of the medium. Furthermore various simulation programs have shown the deficiencies of the CSMA/CA protocol for multi-hop communication.

The medium access method according to the invention solves the problem of access collisions and periodic reservations in an ad hoc mode of operation. Owing to its distributed nature, the method according to the invention does not require necessarily a central unit or master station for regulating communication with the system.

As discussed above in relation with FIG. 1 a proposed draft for IEEE 802.11n provides a so called Distributed Reservation Protocol. The proposal for P802.11n does not have such a reservation mechanism in the ad hoc mode of operation. A system compliant with the proposal for P802.11n will be a so-called Multiple Input Multiple Output (MIMO) system with various possible data rates. This means that a traffic stream is optimized for a specific receiver (or group of receivers) and other stations might not necessarily be able to overhear such a transmission. However, the distributed reservation protocol (DRP) requires the other stations to overhear the reservation announcements included in their neighbors' packets. The method according to the invention therefore foresees that the reservation information is included in that part of the Physical layer (PHY) header of the packets, which is transmitted at a robust low throughput data rate and eventually even single antenna transmission mode, which can be understood by most neighboring stations.

The DRP foresees that stations which are planning a data transmission, announce the starting point in time, duration of the transmission and eventually even the frequency or code channel in a reservation packet. This reservation packet is overheard by the other stations in the reception range of the sending station of the reservation request. The other stations store this information and defer from any medium access at the announced point in time on the respective frequency code channel and for the duration of the planned transmission. The reservation information can refer to a single reservation or a multitude of periodic reservations.

In a preferred embodiment of the DRP, the receiving station of a reservation request acknowledges the reservation request by returning a message repeating said reservation information, and other stations than the intended receiving station active in the reception range for transmissions of said receiving station perform the actions of storing said reservation information locally and defer from medium access during the time period and on the channel of the future transmission upon overhearing said acknowledgement message. Thereby, in order to clear the medium also on the receiver side, the reservation packet is sent back by the intended receiving station, when it is received from the sending station. By these means, the other stations in the reception range of the intended receiving station are informed about the planned transmission of the sending station and can also defer from any medium access during the announced period. In a further preferred embodiment of the DRP, the reservation request (and response) include information on the priority or priority/traffic class of the transmission planned during the reserved period.

As mentioned above, DRP reservation information can be transmitted piggyback to DATA, ACK or other frames. Furthermore, it is necessary that neighboring stations overhear the reservation information to make a local entry and defer from medium access at the announced time period in the future. One problem is that in most current implementations a station will only decode the packet until the receiver address in the header of the frame. Only if the receiver address matches the own address or a multicast group, in which the station participates, the remainder of the frame will be decoded. This suggests to transmit the reservation information before the receiver address or to add a rule that any packet has to be decoded up to the reservation information.

Stations decode the PHY header of most of the frames, because the PHY header contains the DURATION of the frame exchange. This duration is used by the neighboring stations to set their so-called "Network Allocation vector (NAV)", which controls their access to the medium. This suggests that the reservation information be included in a similar way in the PHY header than as the DURATION field.

Finally the proposal for P802.11n relates to a MIMO system, in which neighboring stations might not be able to successfully decode packets that are transmitted in multiple transmit antennae mode (because the data stream is directed towards a specific receiver). In order to make the DRP protocol work, it is therefore required that the reservation information is included in a part of the frame that is transmitted on a single transmit antenna and at a low data rate. Note that the lower the data rate the further away the signal reaches, which is required for an effective protection of the future transmission from interfering transmissions. In the proposal for P802.11n there are two PHY headers that are transmitted in addition to (and directly following) the legacy PHY header. These HTSIG1 and HTSIG2 headers are transmitted at the robust BPSK modulation and on a single transmit antenna.

Figure 3:
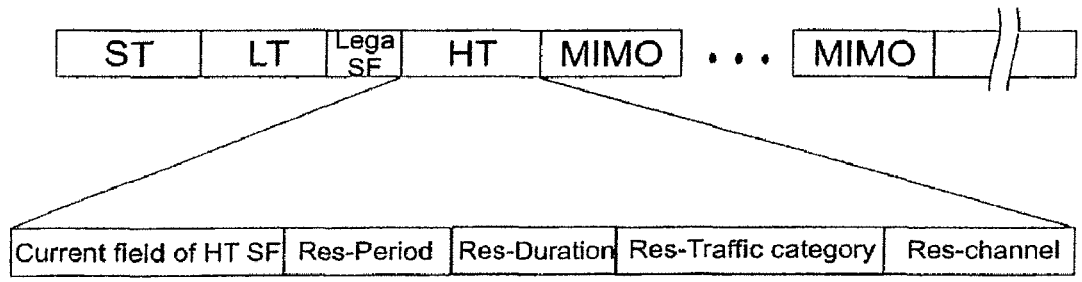
FIG. 3 shows an embodiment of the method according to the invention.

FIG. 3 shows an embodiment of the method according to the invention. In this embodiment the reservation information is included in the single antenna and/or robust modulation and coding PHY header of DATA and ACK frames. One of the two HT headers can be used for transmit the reservation information as illustrated in FIG. 3. The header as shown in FIG. 3 includes a first part including the ST, LT, LEGA SF and the HT filed. The second part comprises fields according to the multiple antenna format MIMO. The first is used for transmitting the reservation information. In particular the reservation information is included into the HT field. However as shown in the following FIGS. 4a,b and 5. The only requirement according to the invention is to incorporate the reservation information into the first part of the header. The ST and The LT field are used for signaling the short training symbol and the long train symbol. The LEGA SF is used for signaling data to the legacy stations according to Standards 802.11a or 802.11e etc. As shown the HT field includes the reservation information for signaling of multiple antenna mode and/or later reservation periods.

Figure 5:
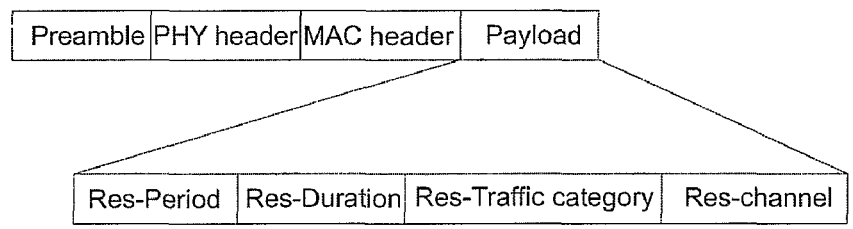

FIGS. 4a, b and 5 show other embodiments of the method according to the invention. In this embodiment it is proposed to transmit the reservation information in a dedicated broadcast/multicast signalling packet, where the whole frame is transmitted by a single antenna and/or robust modulation and coding mode, as shown in FIG. 4a, b and FIG. 5. In a third embodiment, the stations distribute their reservation information as part of a beacon frame, which is transmitted in a transmission mode that can be understood by all neighboring stations. The reservation can be signalled by announcing a contention-free period, which can be understood by legacy 802.11 stations.

The reservation information can e.g. consist of one or several of the following:
 period of the traffic
 duration of the medium reservation
 priority of data transmission
 number of future reservation periods.

In another embodiment the starting point/period of the reservation is signalled relative to the beginning or end of the frame, in which the reservation information is included.

In a yet another embodiment the starting point/period of the reservation is signalled relative to the beginning of a superframe. The period of traffic field could e.g. be called "Target beacon Transmission Time Offset". In order to support periods of reservation that are bigger than the superframe duration, a field would have to be added in this second embodiment to signal that the reservation is included not in every but in every $n^{th}$ superframe. In order to signal periods of reservation that are smaller than a superframe duration, several reservation information elements would have to be included in the reserving frame.

The embodiments of the present invention described herein are intended to be taken in an illustrative and not a limiting sense. Various modifications may be made to these embodiments by those skilled in the art without departing from the scope of the present invention as defined in the appended claims.

It will be clear to a skilled person that the invention is not limited to usage in a wireless communication system but can also be applied in a wired communication system.

Furthermore, although the invention is discussed in relation to wireless communication systems compliant with IEEE Std 802.11 and/or extensions to this standard, it will be clear to a skilled person that the invention can be applied to other wireless communication systems too.

Also, although the discussed embodiments do not explicitly discuss this case, it will be clear to a skilled person that it is possible to make a repeated or periodic reservation by transmitting a single reservation message.

The invention also relates to any system that is using MIMO and dynamic data rate adaptation.

The invention may be applied advantageously in products complying with the upcoming standard IEEE 802.11n, either in chipsets as well as modules and consumer end products based on IEEE 802.11. IEEE 802.11n is the next generation of WLAN with networking of consumer electronics apparatuses (e.g. audio en video equipment) as the main application. This is also the reason while the ad hoc mode of operation is very important, as not all homes will be equipped with an Access Points, but some consumer electronics devices might communicate directly with one another (in ad hoc mode).

The invention claimed is:

1. A method of communication in a wireless communication system in an ad hoc mode, the system having a first station and at least a second station wherein each of the stations for at least a part of the time controls the communication within the system, the method comprising:

the first station encoding and transmitting messages having a first format in a single antenna transmit mode using at least one communication channel or having a second format in a second multiple antenna transmit mode using one communication channel, wherein the single antenna transmit mode and the multiple antenna transmit mode both include a header comprised of a first common part and a second part, said first common part being included as part of packets transmitted at a low throughput data rate, and wherein said second part is transmitted at a higher throughput data rate relative to said low throughput data rate, said first common part further comprising at least reservation information pertaining to one or more upcoming transmissions of the first station, wherein reservation information comprises at least one of: reservation period, duration, traffic category, and reservation channel, wherein the at least second station is only capable of receiving and decoding messages transmitted from the first station in one of the multiple antenna transmit mode or single antenna transmit mode and is capable of receiving and decoding at least the first common part of messages transmitted in either the single antenna transmit mode or multiple antenna transmit mode.

2. The method as claimed in claim 1, characterized in that in the first mode messages are transmitted on at least one channel and in the second mode messages are transmitted on one channel.

3. The method as claimed in claim 1, characterized in that the information of the first station comprises a request to at least the second station to reserve time slots in at least one channel to allow undisturbed periodic transmissions of the first station.

4. The method as claimed in claim 1, characterized in that the common part comprises a first sub-header and a second sub-header, wherein the information on the upcoming transmissions is encoded in one of the first sub-header or the second sub-header.

5. The method as claimed in claim 1, characterized in that messages in the first mode are compliant with one of the standards out of the group of IEEE Std. 802.11a, IEEE Std. 802.11b, IEEE Std. 802.11g, and IEEE Std. 802.11e.

6. A wireless communication system in an ad hoc mode comprising a first station and at least a second station wherein each of the stations for at least a part of the time controls the communication within the system, wherein the first station is arranged for encoding and transmitting messages having a first format in a single antenna transmit mode or having a second format in a multiple antenna transmit mode, wherein the first format include a header comprised of a first common part and a second part, the first common part being included as part of packets transmitted at a low throughput data rate, and wherein said second part is transmitted at a higher throughput data rate relative to said low throughput data rate, the first common part further comprising at least reservation information pertaining to one or more upcoming transmissions of the first station, wherein reservation information comprises at least one of: reservation period, duration, traffic category, and reservation channel, wherein the second multiple antenna transmit format includes a header comprised only of the second part transmitted at said higher throughput data rate relative to said low throughput data rate, wherein the at least second station is only arranged for receiving and decoding messages transmitted from the first station in the multiple antenna transmit mode, and is further arranged for receiving and decoding at least the common part of messages transmitted in the single antenna transmit mode and multiple antenna transmit mode while operating in the multiple antenna transmit mode.

7. A wireless communication device for use as a first station in a wireless communication system in an ad hoc mode including the first station and at least a second station wherein each of the first or second stations for at least a part of the time controls the communication within the system, the device comprising:

means for encoding messages having a first format in a first mode in a single antenna transmit mode using at least one communication channel or having a second format in a multiple antenna transmit mode using one communication channel, wherein the first format includes a header comprised of a first common part and a second part, said first common part being included as part of packets transmitted at a low throughput data rate, and wherein said second part is transmitted at a higher throughput data rate relative to said low throughput data rate, the first common part, said first common part further comprising at least reservation information pertaining to one or more upcoming transmissions of the first station, wherein reservation information comprises at least one of:

reservation period, duration, traffic category, and reservation channel, and means for transmitting the messages; wherein the at least second station is arranged for receiving and decoding messages transmitted from the first station in one of the single antenna transmit mode or the multiple antenna transmit mode, and is further arranged for receiving and decoding at least the first common part of messages transmitted from the first station in either the single antenna transmit mode or the multiple antenna mode.

8. A wireless communication device for use as a second station in a wireless communication system in an ad hoc mode including a first station and the second station wherein each of the first and second stations for at least a part of the time controls the communication within the system, whereby the first station is arranged for encoding and transmitting messages having a first format in a single antenna transmit mode or having a second format in a multiple antenna transmit mode, wherein the first format includes a header comprised of a first common part and a second part, the first common part being included as parts of packets transmitted at a low throughput data rate, and wherein said second part is transmitted at a higher throughput data rate relative to said low throughput data rate, the first common part further comprising at least reservation information pertaining to upcoming periodic transmissions of the first station, wherein reservation information comprises at least one of: reservation period, duration, traffic category, and reservation channel, wherein the device is capable of receiving and decoding messages transmitted from the first station in only the multiple antenna transmit mode, the wireless communication device for use as a second station comprising:

means for receiving at least the first common part of messages transmitted either in the single antenna transmit mode or multiple antenna transmit mode wherein the first common part includes said reservation information pertaining to upcoming periodic transmissions of the first station; and means for decoding at least the first common part of received messages to obtain at least said reservation information.

9. A method as claimed in claim 3, wherein the common part comprises a first header and a second header, wherein the information on the periodic upcoming transmissions is encoded in the first header or the second header.

* * * * *